United States Patent [19]
Donahue

[11] Patent Number: 5,216,683
[45] Date of Patent: Jun. 1, 1993

[54] DC-TO-DC CONVERTER USING SCRS WITH NATURAL COMMUTATION

[75] Inventor: Joel A. Donahue, Brookfield, Mass.

[73] Assignee: Coherent, Inc., Palo Alto, Calif.

[21] Appl. No.: 792,039

[22] Filed: Nov. 13, 1991

Related U.S. Application Data

[60] Continuation-in-part of Ser. No. 757,256, Sep. 9, 1991, Pat. No. 5,142,544, which is a division of Ser. No. 577,875, Sep. 4, 1990, Pat. No. 5,048,033.

[51] Int. Cl.⁵ .................................................. H01J 3/00
[52] U.S. Cl. ......................................... 372/38; 372/33
[58] Field of Search ....................... 372/38, 69, 33, 32; 315/291, 307

[56] References Cited

U.S. PATENT DOCUMENTS

| | | | |
|---|---|---|---|
| 3,749,976 | 7/1973 | Colyn | 372/38 |
| 3,928,819 | 12/1975 | Bernstein | 372/38 |
| 4,745,614 | 5/1988 | Egawa et al. | 372/38 |
| 5,048,033 | 9/1991 | Donahue et al. | 372/38 |

Primary Examiner—Léon Scott, Jr.
Attorney, Agent, or Firm—Limbach & Limbach

[57] ABSTRACT

A DC-to-DC converter using an SCR bridge receives a first DC power signal and generates a current pulse train in response thereto. The current pulse train is supplied to a rectifying bridge which generates the second DC power signal in response thereto. A single capacitor means is placed between the leads of the output rectifier bridge to aid the commutation of the SCR bridge.

6 Claims, 2 Drawing Sheets

DC-TO-DC CONVERTER USING SCRS WITH NATURAL COMMUTATION

This is a continuation in part application of a co-pending U.S. patent application Ser. No. 07/757,256, filed Sep. 9, 1991 now U.S. Pat. No. 5,142,544, which is a division of U.S. patent application Ser. No. 07/577,875, filed on Sep. 4, 1990, now U.S. Pat. No. 5,048,033.

TECHNICAL FIELD

The present invention relates to a power converter for receiving a Direct Current (DC) and for converting it to another DC source. More particularly, the present invention relates to a DC-to-DC power converter using SCR switches with natural commutation.

BACKGROUND OF THE INVENTION

In the prior art, resonant DC-to-DC power converters have been used to produce regulated DC power for various applications. Typically, these DC-to-DC power converters have used transistor switches or SCR thyristor switches. In the case of SCR switches, the SCRs must be turned off either by natural or by forced commutation techniques.

In the natural technique, the energy stored in the main resonant circuit causes the current through the SCR switches to reverse direction automatically and forces the SCRs to turn off.

In the forced technique, additional components and switches are used in a commutation network to create the voltages and currents needed to commutate the SCR switches. These additional circuit components, are in addition to the power converter components and thus, necessarily, make the converter relatively complex.

SUMMARY OF THE INVENTION

In the present invention, a DC-to-DC power converter is disclosed. The converter receives a first DC power signal and converts it into a second DC power signal. The converter comprises SCR means for receiving the first DC power signal and for generating a current pulse train in response thereto. The converter further has rectifier means for receiving the current pulse train and for generating the second DC power signal in response thereto. Finally, a single capacitor means receives the current pulse train and aids the commutation of the SCR means.

DETAILED DESCRIPTION OF THE DRAWINGS

Figure 1:
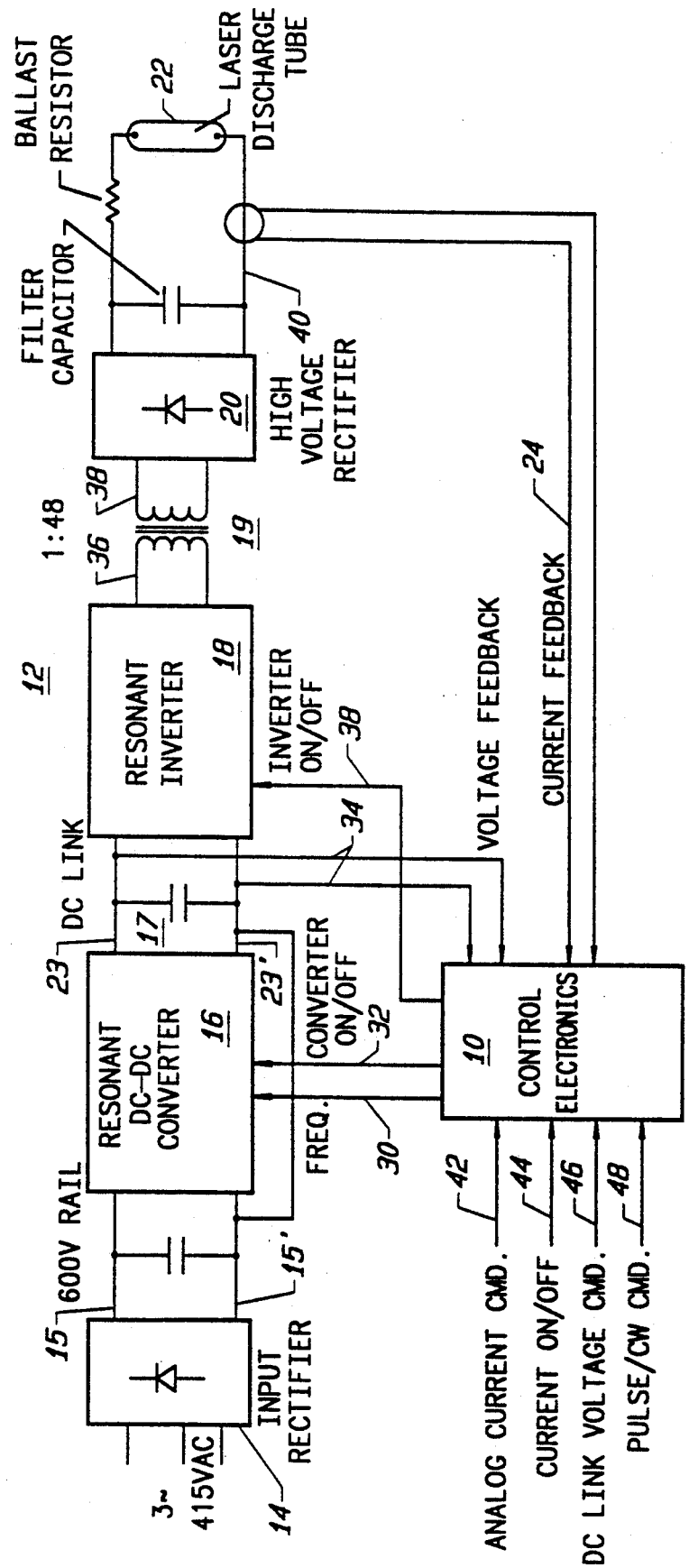
FIG. 1 is a schematic block level diagram of a power supply with an electronic controller using the improved DC-to-DC power converter of the present invention.

Referring to FIG. 1 there is shown in schematic block level diagram a power supply 12 with an electronic controller 10. The power supply 12 is used to supply current to a gaseous discharge apparatus 22, such as a laser discharge tube 22. More particularly, the power supply 12 can be used to control the current supply in two modes, CW and pulsed, to a $CO_2$ laser.

The power supply 12 comprises conventional prior art components, such as an input rectifier 14, a DC link 17, a resonant inverter 18, a transformer 19, and a high voltage rectifier 20. The power supply 12 also comprises an improved resonant DC-to-DC converter 16 of the present invention. The various components will now be briefly described.

The input rectifier 14 of the prior art, receives a three-phase alternating current signal, such as 415 VAC, and converts the AC signal into a + and −300 volt DC signal. This + and −300 volt DC signal, called the input DC signal, is supplied along the input DC rail 15-15' to the converter 16.

The converter 16, as will be described in greater detail hereinafter, receives the input DC signal 15-15', and chops it into a sinusoidal current pulse train 25 (shown in FIG. 2), having a frequency, which is controllable. The frequency is controlled by the frequency control signal 30. The sinusoidal current pulse train 25 is then rectified by a four diode rectifier bridge 21 and produced as an intermediate DC signal 23 and 23', with 23 being of more positive polarity than 23'. In addition, the production of the intermediate DC signal 23-23' is controllable by the converter on/off signal 32. The frequency control signal 30 and the converter on/off signal 32 are both generated by the controller 10 and are supplied therefrom.

The intermediate DC signal 23-23' is supplied to the DC link 17, which comprises a plurality of capacitors, although only one is shown in FIG. 1. The DC link 17 functions to store the energy from the intermediate DC signal 23-23' in the capacitor 17. The voltage of the DC link 17 is measured by the voltage feedback signal 34 which is supplied to the controller 10.

The intermediate DC signal 23 is also supplied as the input to the resonant inverter 18. The inverter 18 receives the intermediate DC signal 23-23' and generates a first AC signal 36. The generation of the first AC signal 36 is controlled by the inverter on/off signal 38, generated by the controller 10 and supplied therefrom.

The output AC signal 36 is supplied to a transformer 19, which steps up the voltage of the first AC signal 36 and produces a second high voltage AC signal 38. The high voltage AC signal 38 is rectified by the high voltage rectifier 20 to produce an output DC signal 40. The output DC signal 40 is then filtered and supplied to a laser discharge tube 22. In addition, the current of the output DC signal 40 is detected and is fed back to the electronic controller 10 along the current feedback signal 24.

In addition to receiving the voltage feedback signal 34, and the current feedback signal 24, in generating the frequency control signal 30, the converter on/off signal 32, and the inverter on/off signal 38, the electronic controller 10 also receives the following signals:

an analog current command signal 42;
a current on/off signal 44;
a DC link voltage command signal 46; and
a pulse/CW mode signal 48.

The electronic controller is shown in greater detail in U.S. Pat. No. 5,048,033, which is incorporated herein by reference.

Figure 2:
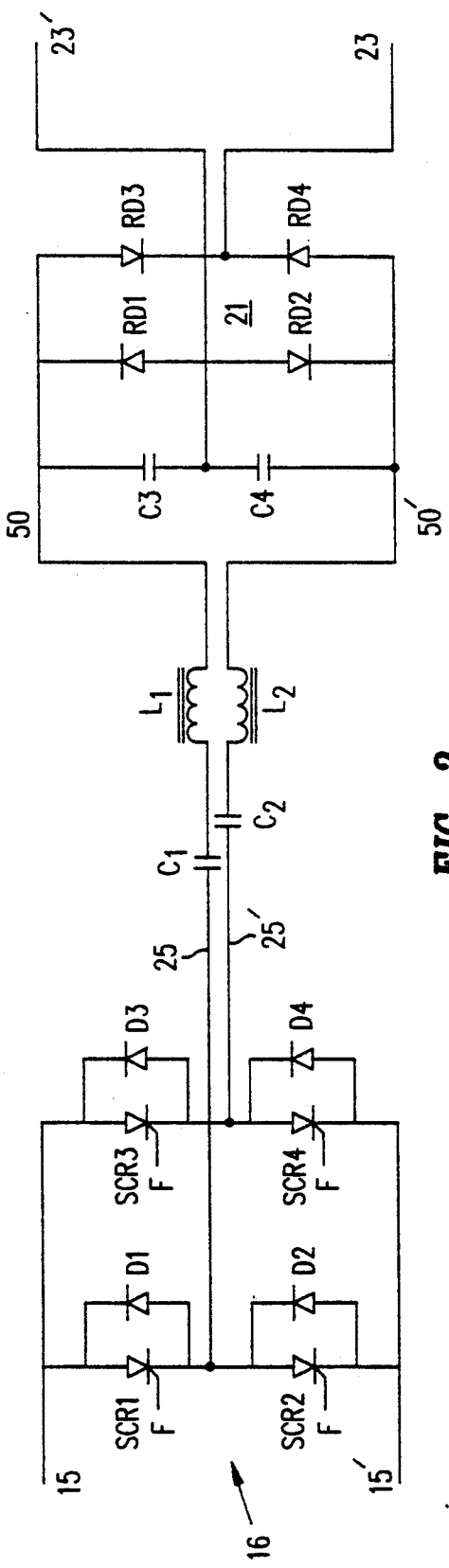
FIG. 2 is a circuit diagram of one embodiment of a DC-to-DC power converter of the present invention.

Referring to FIG. 2, there is shown a detailed circuit diagram of the DC-to-DC converter 16 of the present invention. The converter 16 receives the input DC signal along the leads 15 and 15'. The converter has four SCR switches (SCR1, SCR2, SCR3, and SCR4) each with an associated diode (D1, D2, D3 and D4) connected in a well known bridge configuration. The SCRs receive the input DC signal and chop it into a sinusoidal current pulse train 25 having a frequency, which is controllable. The frequency is controlled by a frequency control signal supplied to each of the SCR switches along its lead "F". The output of the SCR bridge is supplied along the leads 25-25' to a capacitor C and an inductor $L_1$ to the lead 50, with the other output of the SCR bridge supplied to a capacitor $C_2$ and inductor $L_2$ to lead 50'.

At the leads 50 and 50', the signal is a sinusoidal current pulse train which is then rectified by a four diode bridge 21 comprising of rectifying diodes (RD1, RD2, RD3 and RD4). The output of the rectifying bridge 21 is then supplied to the DC link 17 along the leads 23 and 23'. Thus far, the Circuit is well known and is of the prior art.

In the improved DC-to-DC converter 16 of the present invention, a pair of capacitors $C_3$ and $C_4$ are added between the leads 50 and 23 and between the leads 50' and 23'. The capacitor $C_3$ and $C_4$ assist in the commutation of the SCR bridge.

Figure 3:
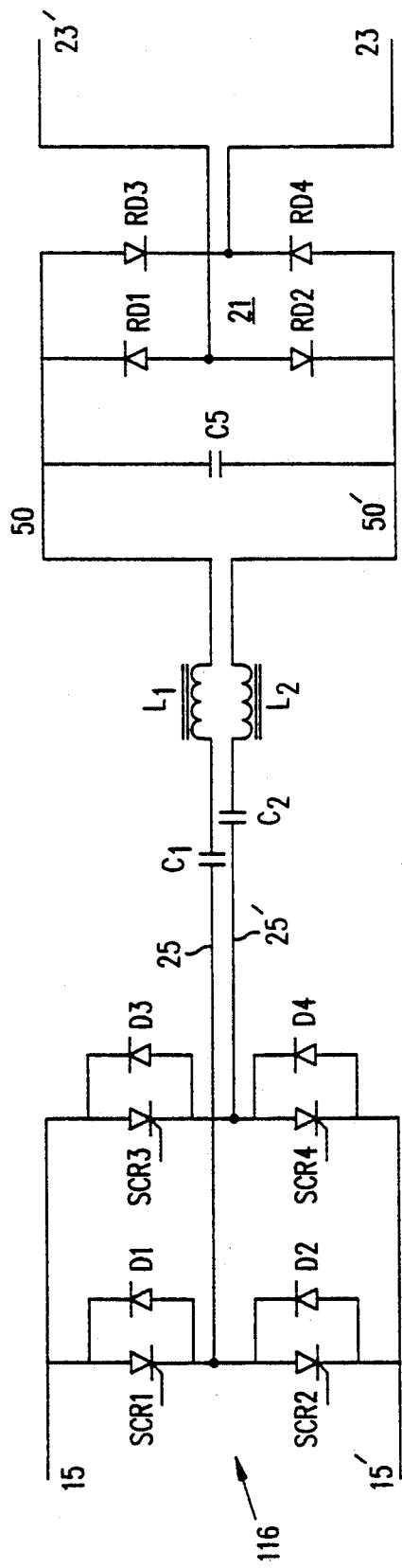
FIG. 3 is a circuit diagram of another embodiment of a DC-to-DC power converter of the present invention.

Referring to FIG. 3 there is shown another embodiment of the DC-to-DC power converter 116 of the present invention. The converter 116 is identical to the converter 16 except that a single commutating capacitor $C_5$ has replaced the capacitors $C_3$ and $C_4$ shown in FIG. 2. The commutating capacitor $C_5$ is placed across the leads 50 and 50' as was the dual capacitor $C_3$ and $C_4$ placed in FIG. 2. Other than this replacement, the circuit 116 shown in FIG. 3 is identical to the circuit 16 shown in FIG. 2.

THEORY OF OPERATION

The theory of operation of the improved converter 16 of the present invention is as follows. In the operation of the converter 16 of the prior art, i.e. without the capacitor $C_3$ and $C_4$, or without the capacitor $C_5$, the rectifying bridge 21 will block the passage of current therethrough when the net voltage applied to it, i.e. the voltage across the leads 50-50' is less than the output voltage on the leads 23-23'. If this situation occurs when the current pulse train applied to the lead 50-50' is in the forward cycle, then this would not be a problem because no current will flow and none of the SCRs (SCR1, SCR2, SCR3 and SCR4), will be latched on. However, if the blocking condition occurs when the current pulse train is in the reverse cycle, no reverse current will flow and there will be no free-wheel current to help the SCRs (SCR1, SCR2, SCR3, or SCR4) to turn off. Thus, for example, if the SCR1 and SCR4 are turned on too soon after the current would have reversed, both SCRs on the same side, e.g. SCR1 and SCR2 or SCR3 and SCR4, will conduct, shorting the input bus of 15-15'. This would limit the maximum operating frequency of the converter 16.

The problem outlined above, would occur at currents that are low compared to the full load rating of the converter 16 when the converter 16 is operating at a fixed frequency and the input voltage is used to control the output current. In addition, the problem would also occur when a major change in either input or load voltage occurs rapidly compared to the resonant period of the converter 16. This severely limits the dynamic range of the converter 16.

More specifically, the blocking condition occurs if the voltage across $C_1$ and $C_2$ is less than 3 times the voltage across the leads 23-23' minus the voltage across the leads 15-15', or when the voltage across the capacitors $C_1$ and $C_2$ is greater than the voltage across 15-15' plus the voltage across 23-23'. In those events, the blocking condition would cause the conducting SCRs to commutate too slowly.

When the capacitors $C_3$ and $C_4$ are added or the single capacitor $C_5$ is added across the leads 50-50', a shunt path is created for the current to flow during the time that the rectifying bridge 21 would normally block the current flow. Because the capacitors $C_3$ and $C_4$ or the single capacitor $C_5$ is across the rectifying bridge 21, the voltage on them or on it is clamped so that once the rectifier 21 starts to conduct, the capacitors $C_3$ and $C_4$ or the single capacitor $C_5$ does not affect circuit operation. When the resonant circuit ($C_1$, $C_2$, $L_1$, and $L_2$) causes the current to reverse, the added capacitance supplies the initial path for the current to flow and also supplements the energy to commutate the SCRs.

Thus, the addition of the capacitors $C_3$ and $C_4$ or the single capacitors $C_5$ across the leads 50 and 50' increases the load current dynamic range without the attending commutation problem. In addition, higher switching speeds can occur without commutation problems.

What is claimed:

1. A DC-to-DC power converter for receiving a first DC power signal and for converting it into a second DC power signal, said converter comprising:

SCR means for receiving said first DC power signal and for generating a current pulse train in response thereto;

rectifier means for receiving said current pulse train and for generating said second DC power signal in response thereto; and a single capacitor means for receiving said current pulse train and for aiding the commutation of said SCR means.

2. The converter of claim 1 wherein said SCR means having a first and a second terminal with the current pulse train supplied on the first terminal and the second terminal.

3. The converter of claim 2 wherein said capacitor means is connected between said first terminal and said second terminal.

4. The converter of claim 3 wherein said rectifier means is connected to said first and second terminals for receiving said current pulse train therefrom, and wherein said rectifier means having a first output and a second output for providing said second DC power signal along said outputs.

5. The converter of claim 4 wherein said SCR means further comprises four SCRs forming an SCR bridge.

6. The converter of claim 4 wherein said rectifier means further comprises four diode means forming a diode bridge.

* * * * *